United States Patent
Sevakula et al.

(10) Patent No.: US 11,222,287 B2
(45) Date of Patent: Jan. 11, 2022

(54) MACHINE LEARNING FOR FAILURE EVENT IDENTIFICATION AND PREDICTION

(71) Applicant: International Business Machines Corporation, Armonk, NY (US)

(72) Inventors: Rahul Kumar K Sevakula, Boston, MA (US); Parag Sanjay Mhatre, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 16/522,132

(22) Filed: Jul. 25, 2019

(65) Prior Publication Data

US 2021/0027205 A1 Jan. 28, 2021

(51) Int. Cl.
| | | |
|---|---|---|
| *G06F 11/00* | (2006.01) | |
| *G06N 20/20* | (2019.01) | |
| *G06F 11/32* | (2006.01) | |
| *G06F 11/34* | (2006.01) | |

(52) U.S. Cl.
CPC .......... *G06N 20/20* (2019.01); *G06F 11/008* (2013.01); *G06F 11/327* (2013.01); *G06F 11/3495* (2013.01)

(58) Field of Classification Search
CPC ... G06F 11/008; G06F 11/327; G06F 11/3495
See application file for complete search history.

(56) References Cited

U.S. PATENT DOCUMENTS

| | | |
|---|---|---|
| 7,872,982 B2 | 1/2011 | Atkins et al. |
| 8,290,746 B2 | 10/2012 | Urmanov et al. |
| 9,727,533 B2 | 8/2017 | Thibaux |
| 9,772,896 B2 | 9/2017 | Caffrey |
| 9,785,497 B1 | 10/2017 | Cook et al. |
| 9,817,884 B2 | 11/2017 | Greifeneder et al. |
| 9,817,971 B2 | 11/2017 | Peleg et al. |

(Continued)

OTHER PUBLICATIONS

S. Alspaugh, B. Chen, J. Lin, A. Ganapathi, M. A. Hearst and R. Kalz, "Analyzing Log Analysis: An Empirical Study of User Log Mining", 28th Large Installation System Administration Conference, 2014, pp. 53-68.

(Continued)

*Primary Examiner* — Charles Ehne
(74) *Attorney, Agent, or Firm* — Patterson + Sheridan, LLP

(57) ABSTRACT

Techniques for failure prediction are provided. A plurality of event indications is received, where each respective event indication corresponds to a respective failure in a computing system. A plurality of machine learning (ML) models is trained based on combinations of event indications in the plurality of event indications, and the ML models are evaluated to generate a respective quality score for each respective ML model. An ensemble of ML models is defined from the plurality of ML models, based on identifying ML models of the plurality of ML models with corresponding quality scores exceeding a predefined threshold. Current data logs from the computing system are processed using the ensemble of ML models, and upon determining that any ML model of the ensemble of ML models predicted a failure based on the current data logs, an alert is generated.

20 Claims, 7 Drawing Sheets

(56) References Cited

U.S. PATENT DOCUMENTS

| | | | |
|---|---|---|---|
| 10,613,962 B1* | 4/2020 | Delange | G06F 11/3006 |
| 2015/0227447 A1* | 8/2015 | Adachi | H04N 1/00042 |
| | | | 358/1.14 |
| 2016/0162779 A1* | 6/2016 | Marcus | G06N 20/10 |
| | | | 706/12 |
| 2016/0299938 A1 | 10/2016 | Malhotra et al. | |
| 2017/0206464 A1 | 7/2017 | Clayton et al. | |
| 2017/0293542 A1 | 10/2017 | Ku et al. | |
| 2019/0065343 A1 | 2/2019 | Li et al. | |

OTHER PUBLICATIONS

M. Klapper-Rybicka, N. N. Schraudolph and J. Schmidhuber, "Unsupervised learning in LSTM recurrent neural networks", International Conference on Artificial Neural Networks, 2001, pp. 684-691.

Z. C. Lipton, D. C. Kale, C. Elkan and R. Wetzel, "Learning to diagnose with LSTM recurrent neural networks", International Conference on Learning Representations 2016.

Z. C. Lipton, D. C. Kale and R. Wetzel, "Modeling missing data in clinical time series with RNNs", Proc. Machine Learning for Healthcare 2016, JMLR W&C Track vol. 56, 2016.

H. Harutyunyan, H. Khachatrian, D. C. Kale and A. Galstyan, "Multitask Learning and Benchmarking with Clinical Time Series Data", arXiv:1703.07771 v2 [stat. ML] Dec. 21, 2018.

K. Greff, R. K. Srivastava, J. Koutn{\"i}k, B. R. Steunebrink and J. Schmidhuber, "LSTM: A search space odyssey", EEE Transactions on Neural Networks and Learning Systems, vol. 28, No. 10, pp. 2222-2232, 2017.

S. Yao, S. Hu, Y. Zhao, A. Zhang and T. Abdelzaher, "DeepSense: A Unified Deep Learning Framework for Time-Series Mobile Sensing Data Processing", Proc. of 26th International Conference on World Wide Web, 2017, pp. 351-360.

K. Pawlowski and K. Kurach, "Detecting Methane Outbreaks from Time Series Data with Deep Neural Networks", Rough Sets, Fuzzy Sets, Data Mining, and Granular Computing, pp. 475-484, 2015 [Abstract Only].

S. Xiao, J. Yan, X. Yang, H. Zha and S. M. Chu, "Modeling the Intensity Function of Point Process via Recurrent Neural Networks", Proc. of Thirty-First AAAI Conference on Artificial Intelligence, 2017, pp. 1597-1603.

Z. Zheng, Z. Lan, B. H. Park and A. Geist, "System log preprocessing to improve failure prediction," 2009 IEEE/IFIP International Conference on Dependable Systems & Networks, 2009, pp. 572-577.

R. K. Sahoo, A. J. Oliner, I. Rish, M. Gupta, J. E. Moreira, S. Ma, R. Vilalta and A. Sivasubramaniam, "Critical event prediction for proactive management in large-scale computer clusters", Proc. of Ninth ACM SIGKDD international conference on Knowledge discovery and data mining, 2003, pp. 426-435.

M. Du, F. Li, G. Zheng and V. Srikumar, "DeepLog: Anomaly Detection and Diagnosis from System Logs through Deep Learning", Proc. of 2017 ACM SIGSAC Conference on Computer and Communications Security, 2017, pp. 1285-1298.

* cited by examiner

MACHINE LEARNING FOR FAILURE EVENT IDENTIFICATION AND PREDICTION

BACKGROUND

The present disclosure relates to failure events, and more specifically, to using machine learning to predict failure events.

In various computing systems, failure events, downtime events, and latency occurrences are a major concern for companies and industries. Often, monitoring teams (consisting of many human experts) are maintained to monitor system alerts and identify things which are serious enough to act upon. Maintaining such a team significantly increases recurring expenditures. Additionally, identification of the event takes time. Monitoring team members typically wait for a defined period in order to confirm the occurrence of an event. Such waiting period delays resolution, and allows the operations to continue with sub-optimal performance. Further, resolution steps in most cases require the operation team to restart one or more of the components, or at the least make them nonoperational for a brief period, until the issue is rectified. Such downtime, especially during peak periods, can lead to huge losses and lead to customer dissatisfaction. Moreover, in most cases, both the monitoring team and the operation teams are entirely unaware of the root cause of those events, and therefore are not able to solve/predict the issue in advance. Additionally, the logs generated by servers and related components are too large and complex to be manually analyzed or evaluated.

SUMMARY

According to one embodiment of the present disclosure, a method is provided. The method includes receiving a plurality of event indications, wherein each respective event indication of the plurality of event indications corresponds to a respective failure in a computing system, and training a plurality of machine learning (ML) models based on combinations of event indications in the plurality of event indications. The method further includes evaluating the plurality of ML models to generate a respective quality score for each respective ML model of the plurality of ML models, and defining an ensemble of ML models from the plurality of ML models, based on identifying ML models of the plurality of ML models with corresponding quality scores exceeding a predefined threshold. Additionally, the method includes processing current data logs from the computing system using the ensemble of ML models. Upon determining that any ML model of the ensemble of ML models predicted a failure based on the current data logs, the method includes generating an alert.

According to a second embodiment of the present disclosure, a computer-readable storage medium is provided. The computer-readable storage medium has computer-readable program code embodied therewith, the computer-readable program code executable by one or more computer processors to perform an operation. The operation includes receiving a plurality of event indications, wherein each respective event indication of the plurality of event indications corresponds to a respective failure in a computing system, and training a plurality of machine learning (ML) models based on combinations of event indications in the plurality of event indications. The operation further includes evaluating the plurality of ML models to generate a respective quality score for each respective ML model of the plurality of ML models, and defining an ensemble of ML models from the plurality of ML models, based on identifying ML models of the plurality of ML models with corresponding quality scores exceeding a predefined threshold. Additionally, the operation includes processing current data logs from the computing system using the ensemble of ML models. Upon determining that any ML model of the ensemble of ML models predicted a failure based on the current data logs, the operation includes generating an alert.

According to a third embodiment of the present disclosure, a system is provided. The system includes one or more computer processors, and a memory containing a program which when executed by the one or more computer processors performs an operation. The operation includes receiving a plurality of event indications, wherein each respective event indication of the plurality of event indications corresponds to a respective failure in a computing system, and training a plurality of machine learning (ML) models based on combinations of event indications in the plurality of event indications. The operation further includes evaluating the plurality of ML models to generate a respective quality score for each respective ML model of the plurality of ML models, and defining an ensemble of ML models from the plurality of ML models, based on identifying ML models of the plurality of ML models with corresponding quality scores exceeding a predefined threshold. Additionally, the operation includes processing current data logs from the computing system using the ensemble of ML models. Upon determining that any ML model of the ensemble of ML models predicted a failure based on the current data logs, the operation includes generating an alert.

DETAILED DESCRIPTION

Figure 1:
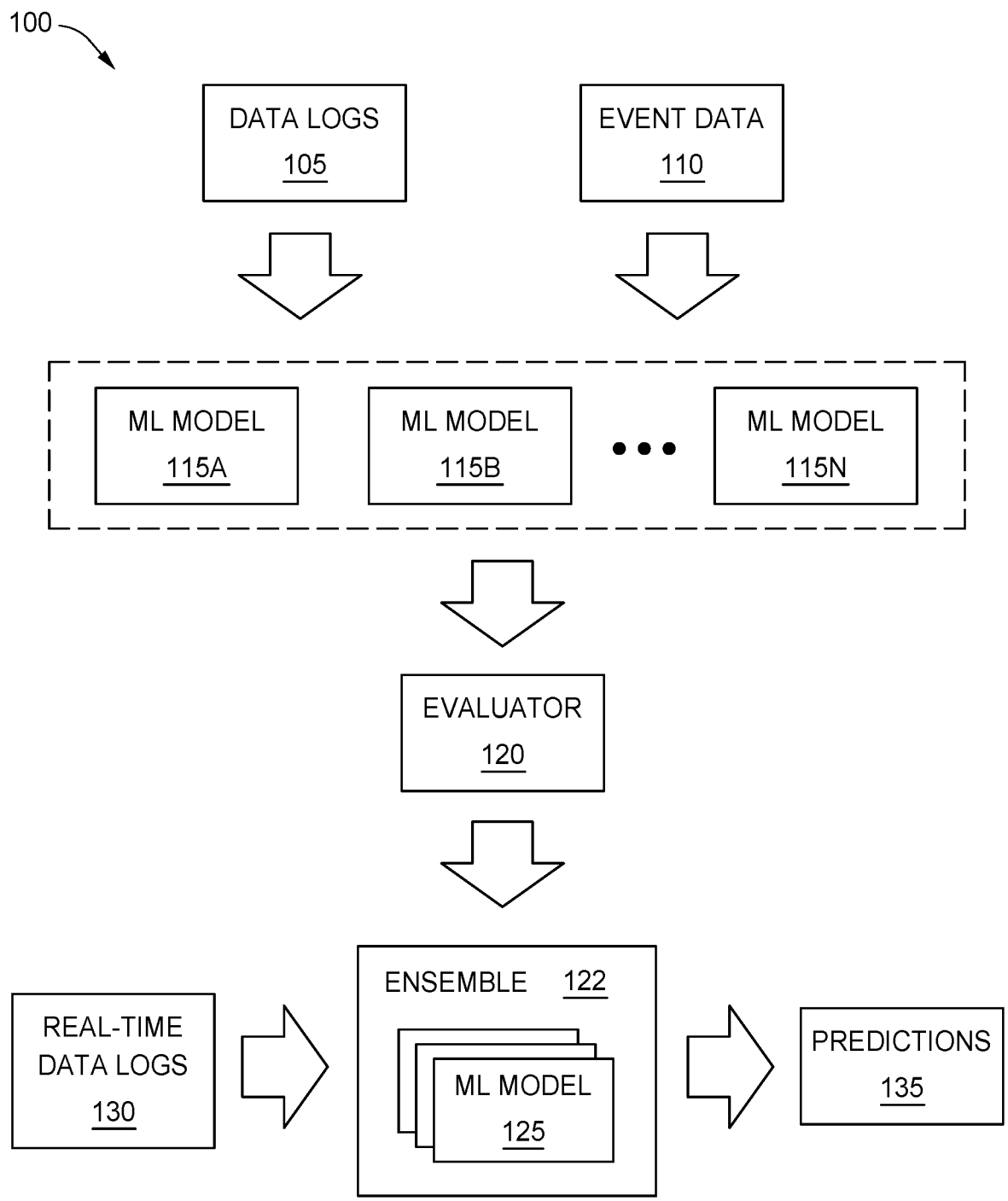
FIG. 1 illustrates a workflow for training and using machine learning models to predict failure events based on log data, according to one embodiment disclosed herein.

Embodiments of the present disclosure utilize machine learning to identify and predict the occurrence of failure events on time and more accurately. In embodiments, the machine learning model is shown to identify useful patterns from time-series log data, for the purpose of event identification and prediction. Often, failure events are relatively rare occurrences (e.g., happening a few times a month), which precludes existing systems from utilizing machine learning approaches (e.g., because the available training data is minimal). Additionally, the failure events (even of a similar type) may be precipitated by different root causes (e.g., different patterns in the data logs). In embodiments of the present disclosure, highly constrained models are trained and deployed to identify failure events.

In one embodiment, a separate long short-term memory (LSTM) classifier is trained for each combination of failure events. In one embodiment, to train the classifier(s), the corresponding timestamps where considered events occur are labelled as "1", and all remaining timestamps are labelled as "0". The constrained LSTM classifier is expected to learn a concrete pattern that is common to the events considered. In an embodiment, once the models have been trained on each combination, the useful classifiers are identified and retained, while less-accurate ones are removed or discarded. In some embodiments, the best models are identified based on, for example, their training performance as measured with respect to the geometric mean of sensitivity and specificity, and/or their comprehensiveness of learning events that may be missed by the better classifiers.

In an embodiment, an ensemble of LSTM-based classifiers is used to predict failure events in advance, and/or to identify the occurrence of failure events at the onset. In one embodiment, a failure event is said to be predicted/identified if any of the classifiers predict/identify the occurrence of failure event. In one embodiment, a separate classifier is trained for each possible combination of failure events. In such an embodiment, the number of trained models is equal to the size of Power set (i.e., $O(2^K)$, where K is the number of events). This procedure may be too computationally expensive when the number of failure events grows. In various embodiments, in order to control the computational complexity, techniques are used to more efficiently train and identify useful models. In one embodiment, a top-down pruning approach is used, as discussed below in more detail. In another embodiment, a greedy approach can be used to identify similar events, as discussed in more detail below.

Advantageously, when failure events are predicted in advance, the required corrective operations can be performed at a time or in a way which has the least impact on business and customers. Customer satisfaction can thus be improved, and the costs paid for human support staff can be reduced. Further, costs can be saved in terms of process efficiency, as prediction of failure events could prepare the support staff in a much better manner.

FIG. 1 illustrates a workflow 100 for training and using machine learning models to predict failure events based on log data, according to one embodiment disclosed herein. In the illustrated embodiment, Data Logs 105 and Event Data 110 are used to train to a collection of ML Models 115A-N. The Evaluator 120 then selects one or more of the models to be deployed, and creates an Ensemble 122 of ML Models 125. As illustrated, this Ensemble 122 receives Real-time Data Logs 130, and generates Predictions 135. In one embodiment, each event indicated in the Event Data 110 corresponds to a particular failure that occurred in a computing system, and specifies the timestamp at which the failure occurred. In an embodiment, the Data Logs 105 include time-series data over a period of time (e.g., a sequence of logs collected from the monitored system), each of which has d dimensions. That is, there may be any number of dimensions in the Data Logs 105 (e.g., there may be any amount and type of data that is logged and considered).

Embodiments of the present disclosure identify useful patterns in the Event Data 110 and Data Logs 105, which can be helpful in predicting future event occurrences. That is, although two events may cause different failures, they may share a common cause. Similarly, two failures may have the same affect, but be caused due to different reasons. In one embodiment, a heavily-constrained LSTM classifier is trained for each possible combination of events. For example, suppose the Event Data 110 includes indications of events A, B, and C. In an embodiment, the system can train a first ML Model 115 based on the combination of events A, B, and C, a second model based on events A and B (e.g., without event C), a third based on B and C, and a fourth based on A and C. In some embodiments, a subset of the combinations are trained and evaluated iteratively in order to reduce the number of models required. This is discussed below in more detail.

In an embodiment, the d-dimensional Data Logs 105 used to train each of the ML Models 115 are the same, but the corresponding training labels are changed based on the combination of events that are being used to train the model. In one embodiment, the data logs are labeled based on whether an event is considered to have occurred (or been ongoing) during that log. For example, for all logs collected between the starting time and ending time of an event, a label of "1" can be assigned. A label of "0" can then be assigned for all other data logs. That is, if an ML Model 115 is being trained based only on an event "A," the Data Logs 105 that correspond to the time when event A was occurring are labeled "1," while all others are labeled "0." The ML Model 115 is then trained using the data logs as input, and their corresponding labels as the target output. Similarly, if an ML Model 115 is being trained based on the combination of events A and B, all data logs corresponding to the time during which event A are labeled "1," as are all the data logs corresponding to the time of event B. The data logs recorded when neither event A nor event B were occurring are labeled "0."

In some embodiments, the ML Models 115 are trained on sequences. Accordingly, input data for each ML Model 115 is a three-dimensional array, where the three dimensions refer to the number of samples, the length of the sequence, and the features available at each timestamp. For the purpose of training ML Models 115, a sequence of feature values as observed in consecutive timestamps is inputted as a training data sample, and the class label of the upcoming (e.g., the subsequent) timestamp is put forth as the desired class label. That is, in one embodiment, the ML Models 115 are trained using one or more Data Logs 105 as input, while the label of one or more subsequent Data Logs 105 are trained as target output. This allows the ML Models 115 to be trained to predict events before they occur, rather than as they occur.

In some embodiments, this process is repeated for each ML Model 115 to be trained (e.g., for each combination of events being considered). In embodiments, the number of time instances when event(s) occurred is likely to be far fewer than those when there was no event occurring. In one embodiment, therefore, care is taken to avoid the potential impact of class imbalance during classifier training. For example, in one embodiment, appropriate class-weights are assigned to the data logs to minimize the impact of class-imbalance. In some embodiments, prior to training the ML Models 115, the Data Logs 105 are normalized using a common timestamp and sampling. For example, if one data stream provides data every second while another provides data every minute, the system may normalize the data to use Data Logs 105 on a per-minute basis (e.g., by summing or averaging the per-second data for each minute), or may normalize the data on a per-second basis (e.g., by extrapolating from the per-minute data to yield Data Logs 105 on a per-second basis). In one embodiment, for asynchronous logs like error/exception logs, the logs are aggregated (e.g. by counting, summing, or taking their mean) with respect to the common timestamp of the other logs.

In some embodiments, heavily constrained LSTM classifiers are utilized as the ML Models 115. In an embodiment, each LSTM classifier has an input layer, followed by a single LSTM layer, followed by a dense layer. Heavy constraints can be applied by taking special care during parameter assignment. In one embodiment, one or more the following constraints can be utilized: a) assigning low number of output features for the LSTM layer, b) assigning a dropout ratio at the output of LSTM layer with value greater than or equal to 0.3, c) assigning a positive recurrent dropout ratio to the LSTM layer with value greater than or equal to 0.1, and/or d) controlling and determining the length of historical sequence to be considered based on the data and system properties.

As illustrated, once the ML Models 115A-N are trained, an Evaluator 120 selects one or more of the best to be deployed, using any appropriate evaluation criteria. In one embodiment, the Evaluator 120 can evaluate, for each ML Model 115, its training performance with respect to the square root of its sensitivity and specificity, and/or the comprehensiveness of the ML Model 115 in learning events which are otherwise missed by the other (and/or the better) classifiers. That is, if none of the ML Models 115 with high training performance can reliably identify a given event C, the Evaluator 120 will identify and select the ML Model 115 that best identifies the event C, even if it is not entirely reliable.

In the illustrated embodiment, the selected models are deployed as an Ensemble 122 of ML Models 125. The Ensemble 122 can be used to predict and identify event occurrences in the Real-Time Data Logs 130 received from the computing system. As illustrated, the ML Models 125 generate Predictions 135 based on this real-time data, in order to predict whether a failure event is occurring (or is about to occur). In an embodiment, an alert on event occurrence is generated and/or provided if any of the ML Models 125 in the Ensemble 122 identify/predict an event occurrence. In this way, the system 100 and/or users can rapidly respond to ongoing failures.

In an embodiment, the number of ML Models 115 to be trained and evaluated is dependent, at least in part, on the number of events that are reflected in the Event Data 110. For example, in some embodiments, an ML Model 115 is trained for every possible combination of events. In such an embodiment, the total number of ML Models 115 that are trained and evaluated for a set of K events is equal to $2^K-1$. Thus, in such an embodiment, the order of time complexity is $O(2^K)$. In some embodiments (e.g., if the value of K is high or exceeds a predefined threshold), various approaches are applied to reduce computational expense and computation.

In one embodiment, the training is streamlined by utilizing parallel processing. That is, because training of each ML Model 115 is independent of any other, if multiple cores and/or nodes are available for computation, the ML Model 115 training can be assigned in parallel to different cores/nodes. In other words, the execution time of the training can be reduced by a factor equal to the number of cores/nodes available for computation (although the computational expense required remains the same).

In another embodiment, a top-down approach is utilized. In such an embodiment, a first ML Model 115 is trained for all K event occurrences (e.g., with a label of "1" for data logs corresponding to any of the K events). In an embodiment, a training accuracy threshold is defined and applied to evaluate this ML Model 115. That is, if the first ML Model 115 built on K event occurrences achieves a training accuracy that is greater than the defined threshold, the ML Model 115 is accepted and there is no need to train any models for any combination of events derived from those K events. In other words, these combinations of events would be exempted from training a model over them. As an example, suppose the Event Data 110 includes events A, B, and C. If a first ML Model 115 trained on all three events is sufficiently accurate, the system refrains from training any ML Models 115 based on A and B alone, based on A and C alone, based on B and C alone, or based on A, B, or C independently.

That is, if a ML Model 115 for a given combination achieves good training performance (even under strict constraints), it indicates that those events are related by a common cause and/or by a common underlying pattern. As all these events are related, any subset events of that set of K events would naturally be related. Therefore, the probability of capturing more unique information (which is the primary objective of training the ML Models 115 on all event combinations) is low. Thus, in an embodiment, the system 100 refrains from training ML Models 115 for these subsets events. In an embodiment, if the first ML Model 115 trained on all K events is not sufficiently accurate, the System 100 trains and evaluates ML Models 115 for all combinations of K−1 event occurrences, and so on for combinations of fewer events until accuracy is reached.

Continuing the above example, if the ML Model 115 trained on A, B and C (where K=3) is not sufficiently accurate, the system 100 can train three new ML Models 115 based on any 2 events (K−1). That is, the system 100 will train and evaluate a model based on A and B, a model based on B and C, and a model based on A and C. This process can be recursively performed for each of these models. For example, if the model trained on A and B is not sufficiently accurate, the system will train ML Models 115 on the corresponding subsets of events: A alone, and B alone. In this way, training can cease as soon as a sufficiently accurate model is found, while avoiding training unnecessarily-granular models on small subsets of events. In an embodiment, this approach continues to have a worst-case time complexity of $O(2^K)$. However, in practice, the number of ML Models 115 that need to be trained can be significantly reduced (often up to or exceeding 50%). In an embodiment, the defined training accuracy threshold is an important parameter which affects the reduction in combinations trained.

In some embodiments, a greedy approach is used to reduce the number of combinations being trained. In one embodiment using this approach, the number of ML Models 115 trained is of the order of O(2K). In an embodiment, this approach involves creating and training a separate ML Model 115 for learning the patterns preceding each event individually, and then using those ML Models 115 to identify which events are similar to each other. Events caused due to similar patterns are grouped together, and the new ML Models 115 are trained over the grouped events (where necessary). Thus, in such an embodiment, ML Models 115 are trained in two runs: once when a model is trained for each event independently, and a second time when a model is trained for similar events which are grouped together.

Therefore, the total number of ML Models 115 trained in such an embodiment is in the worst case O(2K).

In an embodiment utilizing the greedy approach, once an ML Model 115 is trained for each event individually, the trained models are used to predict over the entire training data containing all sequences pertaining to non-events and events. If a given ML Model 115 is able to predict both the event for which it was trained as well as one or more other events for which it was not trained (e.g., up to a desired value of sensitivity or accuracy), then the one or more other events which were predicted are grouped together with the event used to train the model. That is, if a ML Model 115 can predict other events, it is likely that the predicted events had similar patterns preceding their occurrence. In this manner, event groupings are identified using each of the ML Models 115 trained on single event. Once that is completed and events are grouped, a second run of model training is performed. During this second run, for each event grouping, a ML Model 115 is trained using all sequence data samples which correspond to the events that are part of the group (labeled as "1"), and all remaining sequence data samples across the entire duration, both non-events as well as events which are not part of the group (labeled as "0").

The ML Models 115 trained in the second run would be used as the final classification models which for future prediction. In an embodiment, when the first run ML Models 115 (which are each trained over a single event) are made to predict over the entire training data, it is typically found that in addition to events being predicted, there are some false positives in the predictions. In one embodiment, the second run models which are trained on grouped events have access to more sequence data samples which correspond to events. Additionally, the events which are not part of the group are also labelled as "0". In this way, the second training run helps the models to learn the event sequence patterns more strictly, and they are found to predict far fewer false positives.

Figure 2:
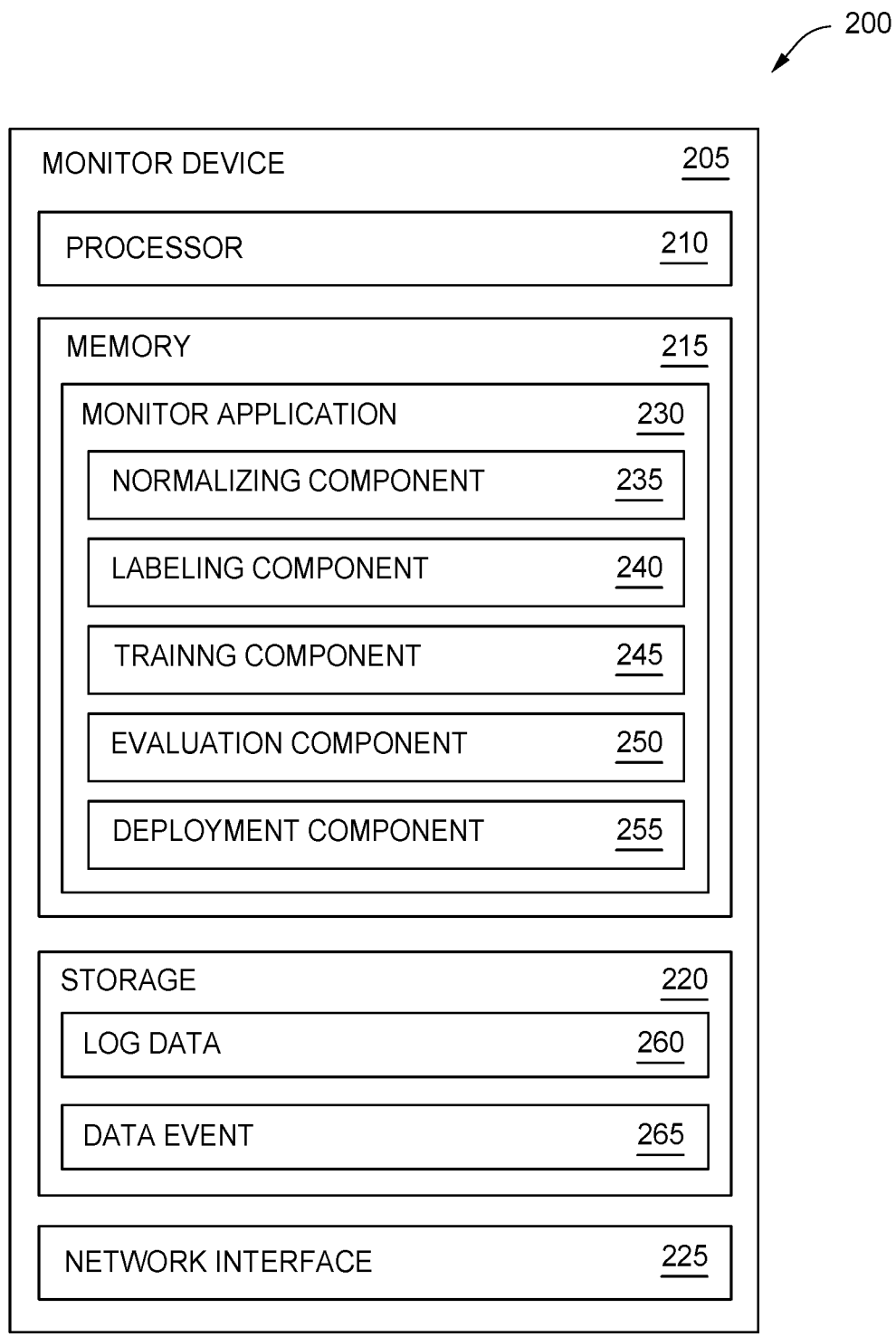
FIG. 2 is a block diagram illustrating a monitor device configured to use machine learning to predict failure events in a computing system, according to one embodiment disclosed herein.

FIG. 2 is a block diagram illustrating a Monitor Device 205 configured to use machine learning to predict failure events in a computing system, according to one embodiment disclosed herein. In the illustrated embodiment, the Monitor Device 205 includes a Processor 210, a Memory 215, Storage 220, and a Network Interface 225. In an embodiment, the Processor 210 retrieves and executes programming instructions stored in Memory 215, as well as stores and retrieves application data residing in Storage 220. Processor 210 is representative of a single CPU and/or GPU, multiple CPUs and/or GPUs, a single CPU and/or GPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area network (SAN). Via the Network Interface 225, the Monitor Device 205 can be communicatively coupled with one or more other devices and components. Although illustrated as a physical device, in embodiments, the Monitor Device 205 may be implemented as hardware, software, or using a combination of hardware and software, such as in a cloud environment.

As illustrated, the Storage 220 includes Log Data 260 and Event Data 265. In an embodiment, the Log Data 260 includes data collected from a computing system as it operates. For example, the Log Data 260 may include timestamped logs indicating the value of any system or environmental factor at the corresponding time, such as program variables, CPU workload, temperature, available memory, and the like. In some embodiments, as the Log Data 260 is received, the Monitor Device 205 processes it using one or more ML Models 115 to predict or identify failure events. In one embodiment, the Log Data 260 is thereafter stored for subsequent use in training or refining the ML Models 115. For example, in some embodiments, the Monitor Device 205 retrains or refines the ML Models 115 (or trains entirely new models) periodically. In another embodiment, the Monitor Device 205 retrains or refines (or trains new models) when a predefined number of failures have occurred without being identified or predicted by the currently-deployed models. That is, in such an embodiment, if one or more failure occurs in the computing system but no alert was generated by the Monitor Device 205, the Monitor Device 205 can determine that the ML Models 115 need to be retrained, refined, or replaced using the Log Data 260.

In an embodiment, the Event Data 265 includes indications of failure events that have occurred in the computing system being monitored. For example, in one embodiment, the Event Data 265 indicates, for each event, a time at which the event occurred (e.g., a start time and/or an end time). In some embodiments, the Event Data 265 further indicates other information about each event, such as where it occurred or began (e.g., the hardware or software component where it started), the ultimate result (e.g., whether the system was able to recover automatically or needed user intervention, and/or how much time elapsed until the system to resume normal operations), and the like.

As illustrated, the Memory 215 includes a Monitor Application 230. Although depicted as software residing in Memory 215, in embodiments, the Monitor Application 230 can be implemented using hardware, software, or a combination of hardware and software. Similarly, the functionality of the Monitor Application 230 can be implemented in any computing location (e.g., locally, in the cloud, and the like). In the illustrated embodiment, the Monitor Application 230 includes a Normalizing Component 235, a Labeling Component 240, a Training Component 245, an Evaluation Component 250, and a Deployment Component 255. Although illustrated as discrete components for conceptual clarity, in embodiments, the operations of the Normalizing Component 235, Labeling Component 240, Training Component 245, Evaluation Component 250, and Deployment Component 255 can be combined or divided across any number of components.

In an embodiment, the Normalizing Component 235 receives Log Data 260 and normalizes it based on a common sampling rate and/or a common timestamp or set of timestamps. In some embodiments, the Log Data 260 may include data that was collected or recorded at various rates and from various components of the monitored system. In such an embodiment, the Normalizing Component 235 can normalize the data into discrete logs at a defined sampling rate, in order to consistently train the ML models. In some embodiments, the Normalizing Component 235 further synchronizes the data, such that the logs collected from each discrete location or component in the monitored system is associated with the other data that was collected at the same time.

In the illustrated embodiment, the Labeling Component 240 is used to generate and apply training labels to the Log Data 260 for training the ML models. In one embodiment, the Labeling Component 240 labels the Log Data 260 for a given ML model based on the particular combination of event(s) that are being used to train the model. In an embodiment, labeling the Log Data 260 includes assigning a value of "one" to all logs that correspond to at least one event in the relevant combination, and a value of "zero" to all logs that do not correspond to any of the events in the relevant combination. In this way, the models can be trained to predict events in the relevant combination. That is, the model is trained to classifying input data as "one" when an event in the relevant combination is occurring (or is about to occur). Similarly, the model outputs a "zero" if no event is occurring (or if no event is expected to occur imminently).

In one embodiment, the Training Component 245 receives the labeled Log Data 260 for each combination of events, and trains the ML models using the labeled data. In one embodiment, training the models includes providing the system values included in the Log Data 260 as input for the model, and applying the corresponding assigned label as the target output. In another embodiment, for a given log (or sequence of logs) used as input, the Training Component 245 identifies the label assigned to the immediately subsequent log (or sequence of logs), and uses this identified label as the target output when training the model. The Training Component 245 can then iteratively train each model using each log in the Log Data 260.

In the illustrated embodiment, the Evaluation Component 250 is used to evaluate the trained ML models to identify the most accurate ones. In embodiments, the Evaluation Component 250 can use any number of factors to evaluate the efficacy of the models, including their training performance as measured with respect to the geometric mean of their sensitivity and specificity, their comprehensiveness of learning events that are not detected by the other classifiers, and the like. In one embodiment, the Evaluation Component 250 uses a predefined threshold of accuracy or training performance in order to determine whether to select the ML model for deployment. In some embodiments, the Evaluation Component 250 sorts the ML models based on accuracy or performance, and iteratively selects the highest-ranked model until all events have been covered. That is, in such an embodiment, the Evaluation Component 250 continues to select progressively lower-ranked models for deployment until every event in the Event Data 265 is adequately identified by at least one of the selected models.

In an embodiment, the Deployment Component 255 deploys the selected ML models as an ensemble of models for use in processing received real-time data. In one embodiment, the Deployment Component 255 provides received data (which may first be normalized by the Normalizing Component 235) as input to the ensemble of ML models. That is, the newly-received data logs are provided as input to all of the models in the selected group. In one embodiment, the input is provided in parallel (e.g., to each model simultaneously) in order to quickly identify potential faults. In another embodiment, the data is processed by each model in sequence (e.g., to each model sequentially). In some embodiments, the Deployment Component 255 refrains from processing the data further as soon as any model in the ensemble predicts an event. The Deployment Component 255 can then generate and output an alert (e.g., to a user).

Figure 3:
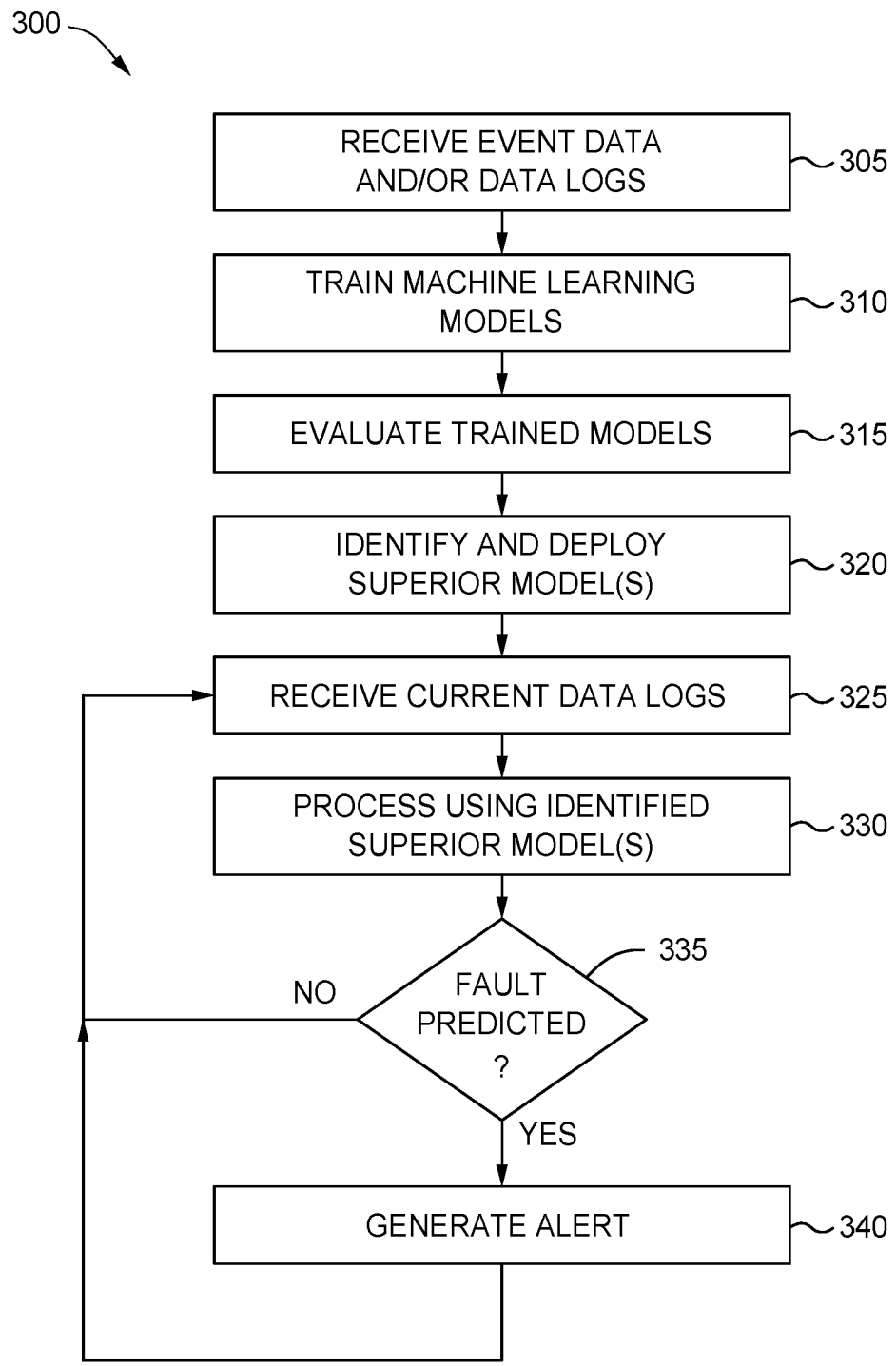
FIG. 3 is a flow diagram illustrating a method for training and using machine learning models to predict faults, according to one embodiment disclosed herein.

FIG. 3 is a flow diagram illustrating a method 300 for training and using machine learning models to predict faults, according to one embodiment disclosed herein. The method 300 begins at block 305, where a Monitoring Application 230 receives event data and/or data logs for a computing system to be monitored. In some embodiments, the Monitoring Application 230 receives the data logs and/or event data directly from the monitored system, as the data becomes available. In another embodiment, some or all of the data maybe user-curated. In one embodiment, the event data corresponds to all failure events that have occurred. In another embodiment, the Monitoring Application 230 only receives (or identifies and selectively processes) event data corresponding to events that meet predefined criteria. For example, in one such embodiment, the Monitoring Application 230 only trains the models based on events that required human intervention, and/or based on events that caused system downtime to exceed a predefined period of time. In this way, failure events that were quickly and/or easily recovered from are not used to train models, reducing computing overhead.

As illustrated, the method 300 continues to block 310, where the Monitoring Application 230 trains one or more ML models based on the received data, as discussed above. In some embodiments, the Monitoring Application 230 trains a separate ML model for each combination of events in the received data. In another embodiment, the Monitoring Application 230 iteratively trains and evaluates ML models to identify the top performers, as discussed above and as discussed in more detail below. The method 300 then proceeds to block 315, where the Monitoring Application 230 evaluates each trained model. In an embodiment, this includes determining an overall quality, accuracy, or adequacy score for each model based on its training performance, and/or based on how well it identifies events as compared to the other models. At block 320, the Monitoring Application 230 identifies and deploys the optimal models, as discussed above.

The method 300 then proceeds to block 325, where the Monitoring Application 230 receives real-time data logs from the monitored system. At block 330, the Monitoring Application 230 processes these logs using the deployed ensemble of superior ML models. Further, at block 335, the Monitoring Application 230 determines whether a fault is predicted by any model in the ensemble. If not, the method 400 returns to block 325 to continue monitoring the system. If a failure is predicted, however, the method 300 proceeds to block 340, where the Monitoring Application 230 generates an alert. This alert or notification can then be output to a user, in order to prompt action.

Figure 4:
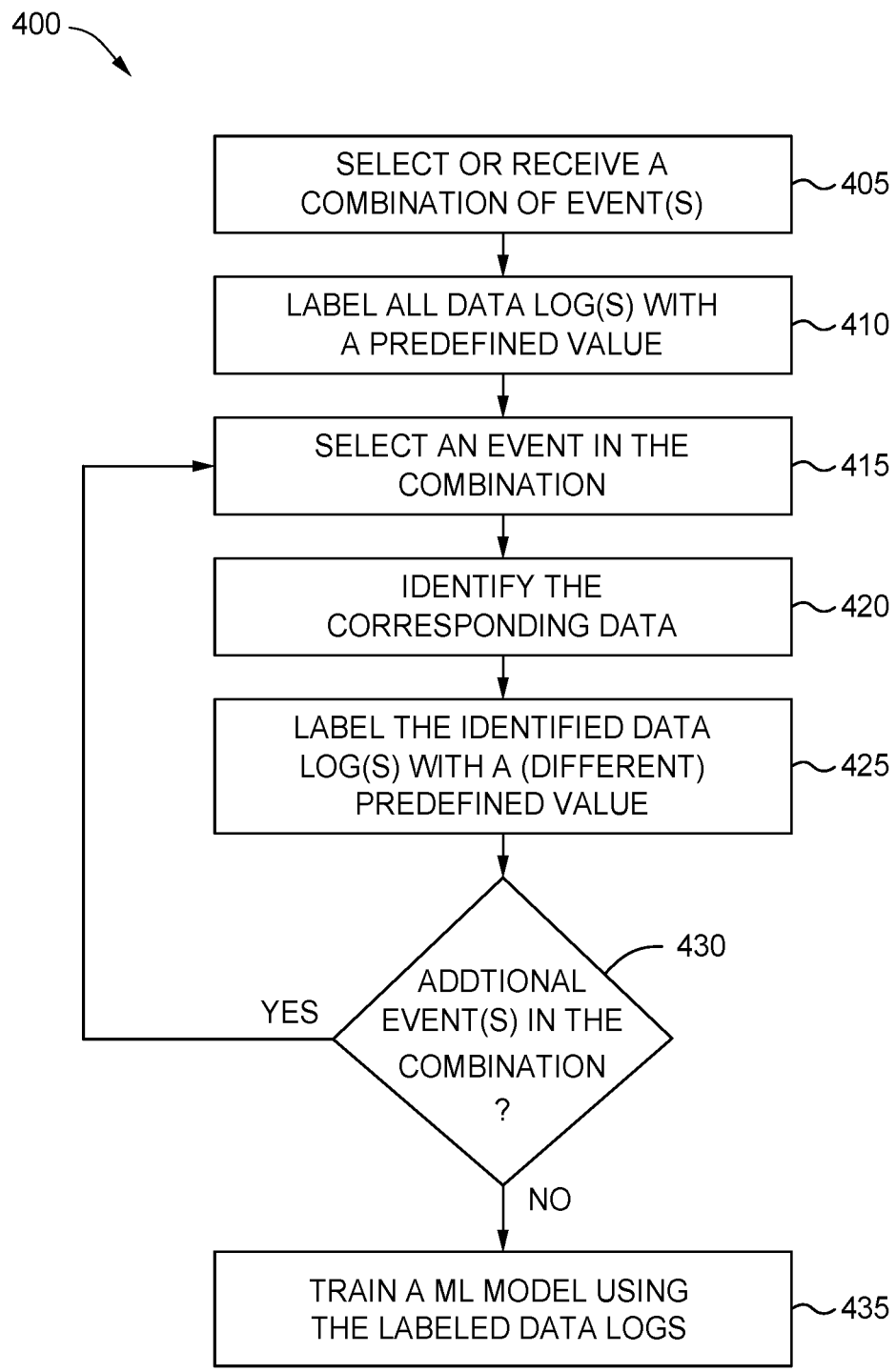
FIG. 4 is a flow diagram illustrating a method for preparing and training a machine learning model using data logs, according to one embodiment disclosed herein.

FIG. 4 is a flow diagram illustrating a method 400 for preparing and training a machine learning model using data logs, according to one embodiment disclosed herein. In an embodiment, the method 400 is performed separately for each ML model to be trained. The method 400 begins at block 405, where the Monitoring Application 230 selects a combination of events, or receives an indication of the combination to use. At block 410, the Monitoring Application 230 assigns each data log in the repository with a predefined value (e.g., zero) indicating that the data log does not correspond to any event in the selected or received combination of events. The method 400 then proceeds to block 415, where the Monitoring Application 230 selects an event in the selected or specified combination. At block 420, the Monitoring Application 230 identifies the corresponding data for the selected event. That is, the Monitoring Application 230 identifies the data log(s) with timestamp(s) that are within the time of the event (or within a predefined time from the event time). Further, at block 425, the Monitoring Application 230 labels the identified log(s) with a predefined value indicating the presence of the event (e.g., a one). The method 400 then proceeds to block 430.

At block 430, the Monitoring Application 230 determines whether there is at least one additional event that has not yet been evaluated or utilized in the received or selected combination. If so, the method 400 returns to block 415. Otherwise, the method 400 continues to block 435, where the Monitoring Application 230 trains a ML model using the labeled data logs. In this way, the Monitoring Application 230 labels the data logs based on whether any event in the combination was occurring, and trains a corresponding ML model to identify or predict the events in the combination. This process may be repeated for other combinations of events, as discussed herein.

Figure 5:
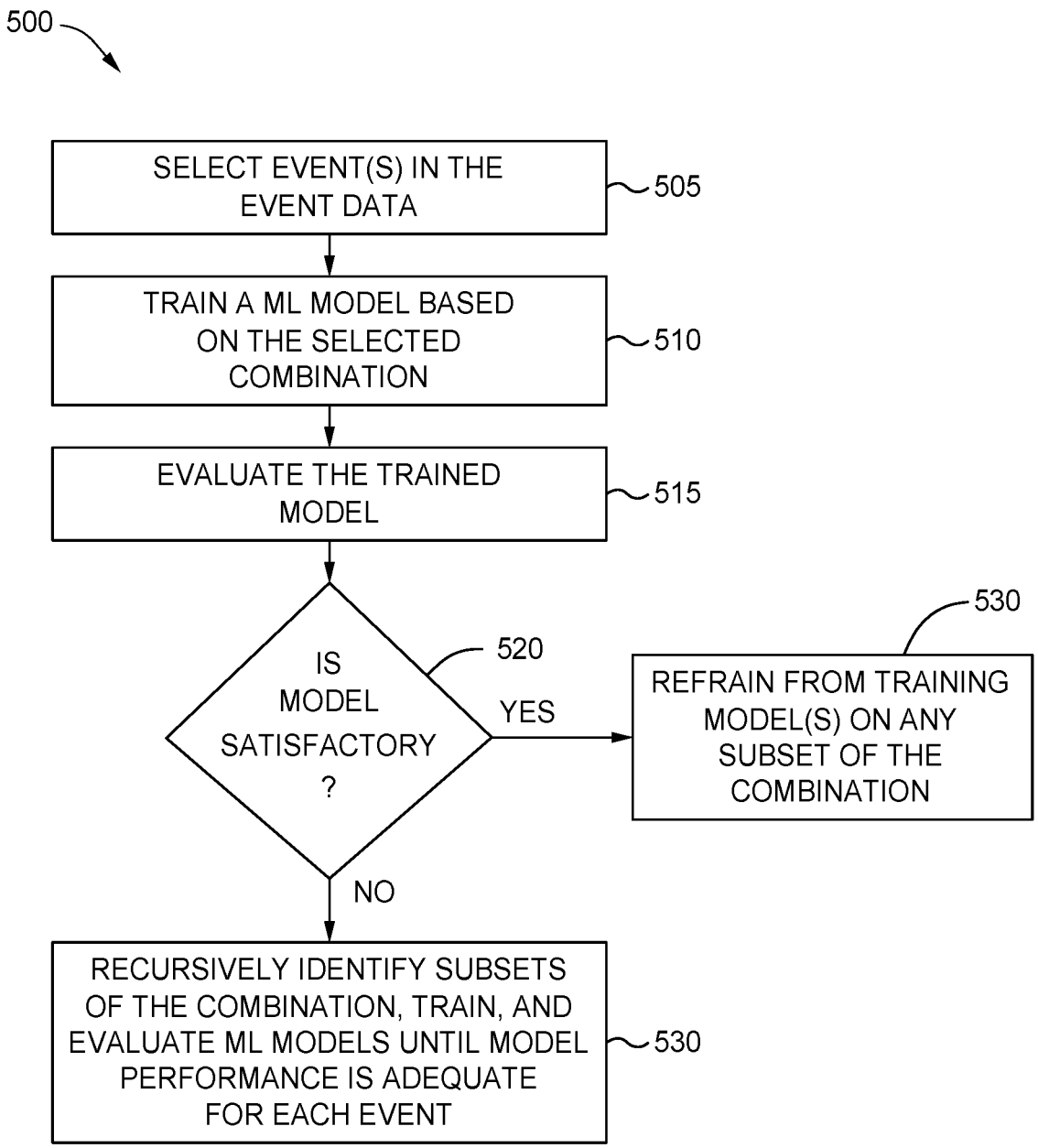
FIG. 5 is a flow diagram illustrating a method for efficiently training machine learning models to identify failures, according to one embodiment disclosed herein.

FIG. 5 is a flow diagram illustrating a method 500 for efficiently training machine learning models to identify failures, according to one embodiment disclosed herein. In an embodiment, the method 500 provides additional detail for the top-down pruning approach discussed above. The method 500 begins at block 505, where the Monitoring Application 230 selects one or more events in the event data. In an embodiment, if the method 500 is being performed for the first time, the Monitoring Application 230 selects all of the events. At block 510, the Monitoring Application 230 trains a ML model based on the selected events. Further, at block 515, the Monitoring Application 230 evaluates the trained model to determine whether it is sufficiently accurate (e.g., whether it satisfies predefined criteria or thresholds). If so, the method 500 proceeds to block 525, where the Monitoring Application 230 deploys the trained model, and refrains from training any additional models based on subsets of the selected combination of events. For example, for events A, B, C, and D, if the currently-selected model is trained on B and C, the Monitoring Application 230 will not train models for B alone or C alone. Similarly, if the current model is trained on A, B, and D, the Monitoring Application 230 will not train models for any subset of A, B, and D (e.g., A and B, A and D, B and D, A alone, B alone, and D alone).

If the model is not satisfactory, the method 500 continues to block 530, where the Monitoring Application 230 recursively performs the method 500 by iteratively identifying subsets of the currently selected combination, and training and evaluating ML models until the model(s) are sufficiently accurate for each event. For example, suppose the set of events includes events A, B, C, and D. If the model is sufficiently accurate for k=4 (e.g., the combination of all four events), the method 500 terminates with this model. If the model is insufficient, the Monitoring Application 230 trains a new model for each k=3 combination (e.g., each combination of three events). Continuing this example, the Monitoring Application 230 will train a separate model for the combination of A, B, and C, the combination of A, B, and D, the combination of A, C, D, and the combination of B, C, and D.

For each of these k=3 combinations, the Monitoring Application 230 similarly evaluates their quality and determines whether to continue. For each model that is sufficiently accurate, the Monitoring Application 230 refrains from generating models for the corresponding subsets. For example, if the A, B, and C model is accurate, the Monitoring Application 230 does not train an A and B model, an A and C model, or a B and C model. The Monitoring Application 230 similarly does not train an A model, a B model, or a C model. Further, in an embodiment, for each k=3 model that is not sufficiently accurate, the Monitoring Application 230 continues to iteratively and recursively generate and evaluate models for k=2 (e.g., combinations of exactly two events). This process repeats until either no additional subsets remain, or the models are trained on single events (e.g., k=1).

Figure 6:
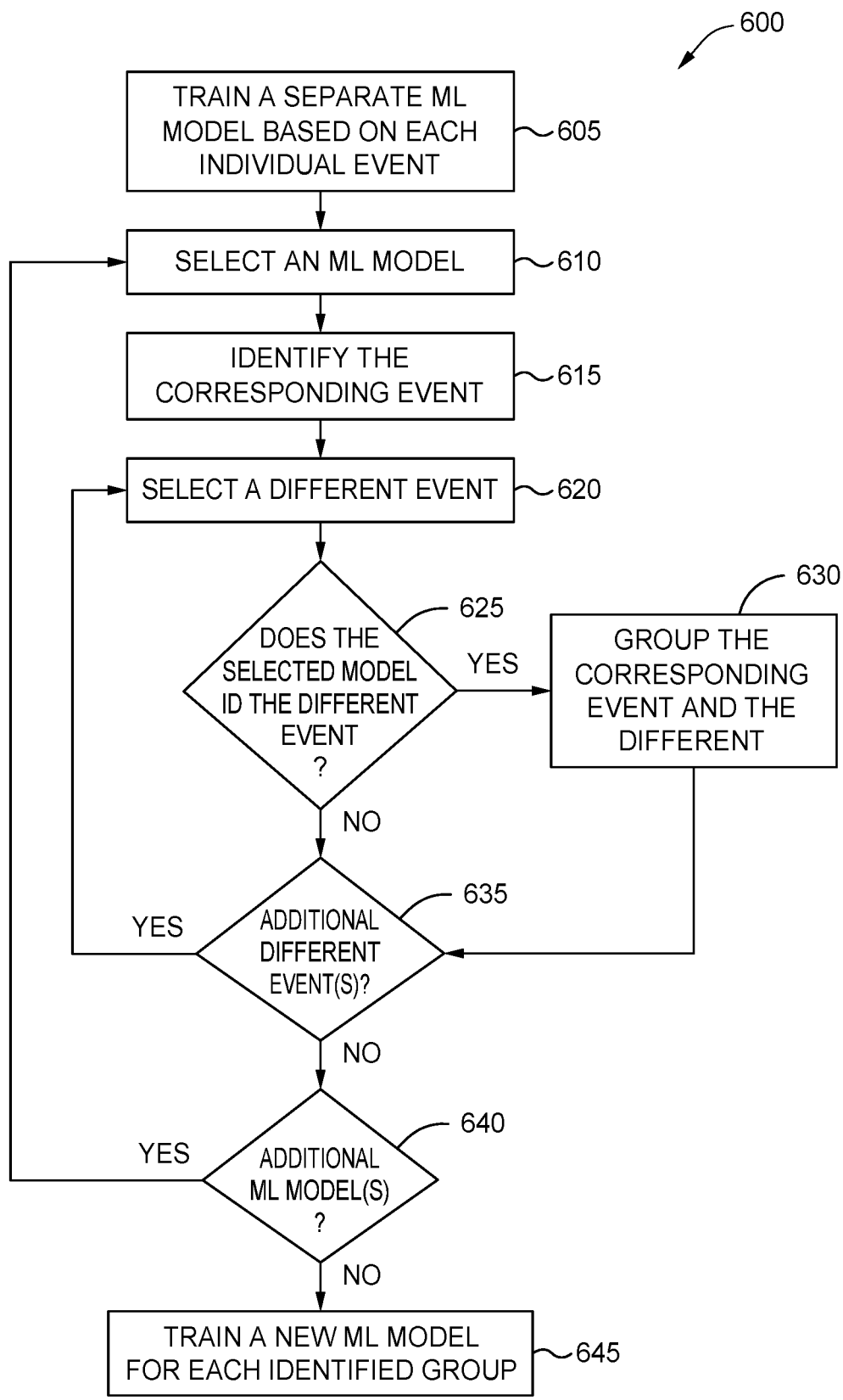
FIG. 6 is a flow diagram illustrating a method for efficiently training machine learning models to identify failures, according to one embodiment disclosed herein.

FIG. 6 is a flow diagram illustrating a method 600 for efficiently training machine learning models to identify failures, according to one embodiment disclosed herein. In an embodiment, the method 600 corresponds to the greedy approach discussed above. The method 600 begins at block 605, where the Monitoring Application 230 trains a separate ML model for each individual event in the event data. At block 610, the Monitoring Application 230 selects one of the trained ML models. The method 600 then continues to block 615, where the Monitoring Application 230 identifies the corresponding event for which the selected model was trained. At block 620, the Monitoring Application 230 selects one of the other events (e.g., an event for which the selected model was not trained). The method 600 then continues to block 625.

At block 625, the Monitoring Application 230 determines whether the selected ML model can accurately identify or predict the selected other event. In one embodiment, the Monitoring Application 230 does so by providing the data logs corresponding to the selected other event (e.g., the logs recorded while the other event was ongoing, or one or more logs immediately preceding the onset of the event) as input to the selected ML model, and determining whether the selected ML model prompts an alert. If so, the events are likely related (e.g., a common ML model could likely be trained for them). If the selected model correctly identifies the selected other event, the method 600 proceeds to block 630, where the Monitoring Application 230 groups the selected other event with the identified event corresponding to the selected model. The method 600 then proceeds to block 635.

Returning to block 625, if the Monitoring Application 230 determines that the currently selected model does not identify or predict the selected other event, the method 600 also proceeds to block 635. At block 635, the Monitoring Application 230 determines whether there is at least one additional different event that is yet to be considered for the selected model. If so, the method 600 returns to block 620. Otherwise, the method 600 continues to block 640. At block 640, the Monitoring Application 230 determines whether there is at least one additional ML model that has not yet been evaluated. If so, the method 600 returns to block 610. Otherwise, the method 600 proceeds to block 645.

At block 645, the Monitoring Application 230 trains a new ML model for each identified group of related events. These new models can then be deployed to identify or predict events in the monitored system during operations.

Figure 7:
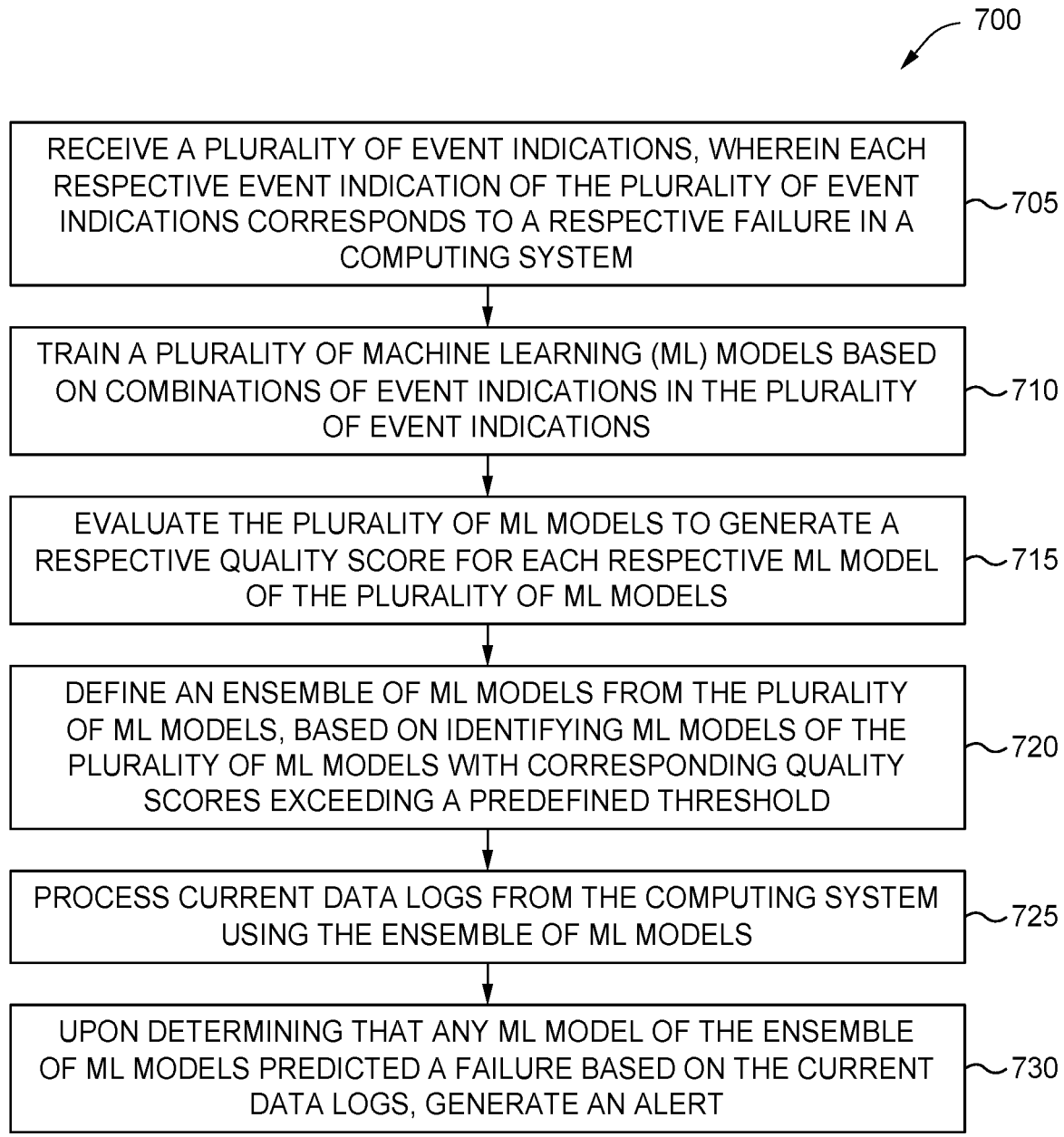
FIG. 7 is a flow diagram illustrating a method to use machine learning models to predict failures, according to one embodiment disclosed herein.

FIG. 7 is a flow diagram illustrating a method 700 to use machine learning models to predict failures, according to one embodiment disclosed herein. The method 700 begins at block 705, where a Monitoring Application 230 receives a plurality of event indications, wherein each respective event indication of the plurality of event indications corresponds to a respective failure in a computing system. At block 710, the Monitoring Application 230 trains a plurality of machine learning (ML) models based on combinations of event indications in the plurality of event indications. The method 700 then proceeds to block 715, where the Monitoring Application 230 evaluates the plurality of ML models to generate a respective quality score for each respective ML model of the plurality of ML models. Further, at block 720, the Monitoring Application 230 defines an ensemble of ML models from the plurality of ML models, based on identifying ML models of the plurality of ML models with corresponding quality scores exceeding a predefined threshold. The method 700 then continues to block 725, where the Monitoring Application 230 processes current data logs from the computing system using the ensemble of ML models. At block 730, upon determining that any ML model of the ensemble of ML models predicted a failure based on the current data logs, the Monitoring Application 230 generates an alert.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and following, reference is made to embodiments presented in this disclosure. However, the scope of the present disclosure is not limited to specific described embodiments. Instead, any combination of the preceding and following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Monitoring Application 230) or related data available in the cloud. For example, the Monitoring Application 230 could execute on a computing system in the cloud and generate and train ML models to identify failures. In such a case, the Monitoring Application 230 could receive and train ML models, and store the log data, event data, and/or models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a plurality of event indications, wherein each respective event indication of the plurality of event indications corresponds to a respective failure in a computing system;
   training a plurality of machine learning (ML) models based on combinations of event indications in the plurality of event indications;
   evaluating the plurality of ML models to generate a respective quality score for each respective ML model of the plurality of ML models;
   defining an ensemble of ML models from the plurality of ML models, based on identifying ML models of the plurality of ML models with corresponding quality scores exceeding a predefined threshold;
   processing current data logs from the computing system using the ensemble of ML models; and
   upon determining that any ML model of the ensemble of ML models predicted a failure based on the current data logs, generating an alert.

2. The method of claim 1, the method further comprising, prior to processing the current data logs using the ensemble of ML models:
   normalizing the current data logs based on a common timestamp and common sampling rate.

3. The method of claim 1, wherein training the plurality of ML models comprises training a separate ML model for each possible combination of event indications, wherein training a first ML model of the plurality of ML models comprises:
   generating training data for a first event indication of the plurality of event indications by:
      retrieving a plurality of historic data logs for the computing system;
      labeling a first historic data log of the plurality of historic data logs with a one, based on determining that the first historic data log was recorded during a first event corresponding to the first event indication; and
      labeling a second historic data log of the plurality of historic data logs with a zero, based on determining that the second historic data log was not recorded during the first event; and
   training the first ML model using the first and second historic data logs as input and corresponding labels as target output.

4. The method of claim 1, wherein evaluating the plurality of ML models to generate the respective quality score for each respective ML model comprises, for each respective ML model of the plurality of ML models:
   determining training performance of the respective ML model with respect to a square root of sensitivity and specificity of the respective ML model; and
   determining a comprehensiveness of the respective ML model to identify events that remaining ML models of the plurality of ML models do not identify.

5. The method of claim 1, wherein training the plurality of ML models comprises:
   training a first ML model based on a first combination of event indication of the plurality of event indications; and upon determining that training accuracy of the first ML model is below a predefined threshold:
training a second ML model based on a subset of the first combination of event indication of the plurality of event indications.

6. The method of claim 1, wherein training the plurality of ML models comprises:
training a first ML model based on a first, second, and third event indication of the plurality of event indications;
evaluating a training accuracy of the first ML model;
upon determining that the training accuracy of the first ML model is below a predefined threshold:
training a second ML model based on the first and second event indications;
training a third ML model based on the first and third event indications;
training a fourth ML model based on the second and third event indications;
evaluating training accuracies of the second, third, and fourth ML models; and
upon determining that the training accuracy of the second ML model is below a predefined threshold:
training a fifth ML model based only on the first event indication; and
training a sixth ML model based only on the second event indication.

7. The method of claim 1, wherein training the plurality of ML models comprises:
training a first ML model based only on a first event indication of the plurality of event indications;
training a second ML model based only on a second event indication of the plurality of event indications; and
upon determining that (i) the first ML model recognizes the second event indication and (ii) the second ML model recognizes the first event indication:
training a third ML model based on both the first and second event indications.

8. A computer-readable storage medium having computer-readable program code embodied therewith, the computer-readable program code executable by one or more computer processors to perform an operation comprising
receiving a plurality of event indications, wherein each respective event indication of the plurality of event indications corresponds to a respective failure in a computing system;
training a plurality of machine learning (ML) models based on combinations of event indications in the plurality of event indications;
evaluating the plurality of ML models to generate a respective quality score for each respective ML model of the plurality of ML models;
defining an ensemble of ML models from the plurality of ML models, based on identifying ML models of the plurality of ML models with corresponding quality scores exceeding a predefined threshold;
processing current data logs from the computing system using the ensemble of ML models; and
upon determining that any ML model of the ensemble of ML models predicted a failure based on the current data logs, generating an alert.

9. The computer-readable storage medium of claim 8, the operation further comprising, prior to processing the current data logs using the ensemble of ML models:
normalizing the current data logs based on a common timestamp and common sampling rate.

10. The computer-readable storage medium of claim 8, wherein training the plurality of ML models comprises training a separate ML model for each possible combination of event indications, wherein training a first ML model of the plurality of ML models comprises:
generating training data for a first event indication of the plurality of event indications by:
retrieving a plurality of historic data logs for the computing system;
labeling a first historic data log of the plurality of historic data logs with a one, based on determining that the first historic data log was recorded during a first event corresponding to the first event indication; and
labeling a second historic data log of the plurality of historic data logs with a zero, based on determining that the second historic data log was not recorded during the first event; and
training the first ML model using the first and second historic data logs as input and corresponding labels as target output.

11. The computer-readable storage medium of claim 8, wherein evaluating the plurality of ML models to generate the respective quality score for each respective ML model comprises, for each respective ML model of the plurality of ML models:
determining training performance of the respective ML model with respect to a square root of sensitivity and specificity of the respective ML model; and
determining a comprehensiveness of the respective ML model to identify events that remaining ML models of the plurality of ML models do not identify.

12. The computer-readable storage medium of claim 8, wherein training the plurality of ML models comprises:
training a first ML model based on a first combination of event indication of the plurality of event indications; and
upon determining that training accuracy of the first ML model is below a predefined threshold:
training a second ML model based on a subset of the first combination of event indication of the plurality of event indications.

13. The computer-readable storage medium of claim 8, wherein training the plurality of ML models comprises:
training a first ML model based on a first, second, and third event indication of the plurality of event indications;
evaluating a training accuracy of the first ML model;
upon determining that the training accuracy of the first ML model is below a predefined threshold:
training a second ML model based on the first and second event indications;
training a third ML model based on the first and third event indications;
training a fourth ML model based on the second and third event indications;
evaluating training accuracies of the second, third, and fourth ML models; and
upon determining that the training accuracy of the second ML model is below a predefined threshold:
training a fifth ML model based only on the first event indication; and
training a sixth ML model based only on the second event indication.

14. The computer-readable storage medium of claim 8, wherein training the plurality of ML models comprises:
   training a first ML model based only on a first event indication of the plurality of event indications;
   training a second ML model based only on a second event indication of the plurality of event indications; and
   upon determining that (i) the first ML model recognizes the second event indication and (ii) the second ML model recognizes the first event indication:
      training a third ML model based on both the first and second event indications.

15. A system comprising:
   one or more computer processors; and
   a memory containing a program which when executed by the one or more computer processors performs an operation, the operation comprising:
      receiving a plurality of event indications, wherein each respective event indication of the plurality of event indications corresponds to a respective failure in a computing system;
      training a plurality of machine learning (ML) models based on combinations of event indications in the plurality of event indications;
      evaluating the plurality of ML models to generate a respective quality score for each respective ML model of the plurality of ML models;
      defining an ensemble of ML models from the plurality of ML models, based on identifying ML models of the plurality of ML models with corresponding quality scores exceeding a predefined threshold;
      processing current data logs from the computing system using the ensemble of ML models; and
      upon determining that any ML model of the ensemble of ML models predicted a failure based on the current data logs, generating an alert.

16. The system of claim 15, wherein training the plurality of ML models comprises training a separate ML model for each possible combination of event indications, wherein training a first ML model of the plurality of ML models comprises:
   generating training data for a first event indication of the plurality of event indications by:
      retrieving a plurality of historic data logs for the computing system;
      labeling a first historic data log of the plurality of historic data logs with a one, based on determining that the first historic data log was recorded during a first event corresponding to the first event indication; and
      labeling a second historic data log of the plurality of historic data logs with a zero, based on determining that the second historic data log was not recorded during the first event; and
   training the first ML model using the first and second historic data logs as input and corresponding labels as target output.

17. The system of claim 15, wherein evaluating the plurality of ML models to generate the respective quality score for each respective ML model comprises, for each respective ML model of the plurality of ML models:
   determining training performance of the respective ML model with respect to a square root of sensitivity and specificity of the respective ML model; and
   determining a comprehensiveness of the respective ML model to identify events that remaining ML models of the plurality of ML models do not identify.

18. The system of claim 15, wherein training the plurality of ML models comprises:
   training a first ML model based on a first combination of event indication of the plurality of event indications; and
   upon determining that training accuracy of the first ML model is below a predefined threshold:
      training a second ML model based on a subset of the first combination of event indication of the plurality of event indications.

19. The system of claim 15, wherein training the plurality of ML models comprises:
   training a first ML model based on a first, second, and third event indication of the plurality of event indications;
   evaluating a training accuracy of the first ML model;
   upon determining that the training accuracy of the first ML model is below a predefined threshold:
      training a second ML model based on the first and second event indications;
      training a third ML model based on the first and third event indications;
      training a fourth ML model based on the second and third event indications;
      evaluating training accuracies of the second, third, and fourth ML models; and
      upon determining that the training accuracy of the second ML model is below a predefined threshold:
         training a fifth ML model based only on the first event indication; and
         training a sixth ML model based only on the second event indication.

20. The system of claim 15, wherein training the plurality of ML models comprises:
   training a first ML model based only on a first event indication of the plurality of event indications;
   training a second ML model based only on a second event indication of the plurality of event indications; and
   upon determining that (i) the first ML model recognizes the second event indication and (ii) the second ML model recognizes the first event indication:
      training a third ML model based on both the first and second event indications.

* * * * *